United States Patent Office 2,751,395
Patented June 19, 1956

2,751,395

ISOMERIC NITROSO-1-PHENYL PYRAZOLES

Wilfred Arthur Freeman, East Barnet, and Ronald Slack, London, England, assignors to May & Baker Limited, Dagenham, England, a British company No Drawing. Application October 17, 1955, Serial No. 541,047

Claims priority, application Great Britain October 19, 1954

3 Claims. (Cl. 260—310)

This invention is for improvements in or relating to heterocyclic compounds and has for its object the provision of new and useful isomeric nitrosopyrazoles and a process for their preparation.

The new compounds of the present invention are the isomeric nitroso-1-phenylpyrazoles of the formula:

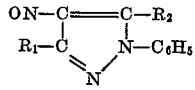

where $R_1$ and $R_2$ are different and represent either methyl or benzyl.

These new compounds are useful therapeutic agents; in particular they are active against virulent strains of Mycobacterium tuberculosis, including certain strains resistant to pyridine-4-carboxyhydrazide (isonicotinyl hydrazide), are very much less toxic than pyridine-4-carboxyhydrazide when administered orally to mice, and are useful agents for combatting fungi and bacteria.

In accordance with a feature of the present invention, the said new compounds may be prepared by nitrosating 1-phenylpentane-2:4-dione and condensing the resulting iso-nitrosoketone with phenylhydrazine and, if desired, separating from each other the isomeric pyrazoles thus produced. The separation of the isomeric pyrazoles of the foregoing formula may readily be effected by conventional means, such as fractional crystallisation from a suitable medium, e. g. light petroleum.

The present invention further provides pharmaceutical preparations containing the new compounds in therapeutically useful quantity in association with a pharmaceutical carrier which may be either a solid material or a liquid. The compositions may take the form of elixirs, tablets, capsules, powders, ointments and other dosage forms suitable for systemic or topical administration. Liquid diluents for parenteral use, i. e. for use by injection, are employed in sterile condition. Such a medium may be a sterile liquid such as water. The compositions of the invention may take the form of active material admixed with solid diluents and/or excipients such as starch, lactose, talc, stearic acid, magnesium stearate, gums or the like. Any of the tabletting materials used in pharmaceutical practice may be employed where there is no possibility of incompatibility with the active therapeutic agent. Alternatively, the active therapeutic agent may, with or without its adjuvant material, be placed in the usual capsule or resorbable material such as the usual gelatin capsule and administered in that form.

Example

A solution of sodium nitrite (31.5 g.) in water (150 ml.) was added dropwise, with mechanical stirring, to an ice-cooled solution of 1-phenylpentane-2:4-dione (75 g.) in water (450 ml.) containing concentrated hydrochloric acid (40 ml.), the temperature being held between 0° and 5° C. Stirring was continued for a further 1 hour. The suspension obtained was added slowly at 0°–10° C. to a mechanically stirred, ice-cooled solution of phenylhydrazine (45 ml.) in water (6 l.) containing glacial acetic acid (360 ml.) Stirring was continued for a further 1 hour. The product was separated by decantation and dissolved in the minimum quantity of cold benzene. The solution was chromatographed on a charcoal column and the green products obtained by elution with benzene were collected and isolated by evaporation of the solvent in vacuo below 40° C. The mixed isomers were dissolved in hot light petroleum (B. P. 60–80° C.) and the solution cooled to give green cubes followed later by blue flattened needles. Both compounds were purified by fractional crystallisation from light petroleum (B. P. 60–80° C.) to give the pure nitrosopyrazoles with the following properties:

1. Turquoise cubes: M. P. 100° C.
2. Turquoise flattened needles: M. P. 85–86° C.

The two compounds are the isomers:

3-benzyl - 5 - methyl-4-nitroso-1-phenylpyrazole and 5-benzyl-3-methyl-4-nitroso-1-phenylpyrazole.

We claim:

1. The pyrazole of the formula:

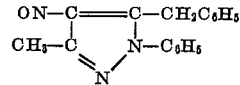

2. The pyrazole of the formula:

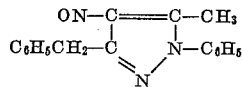

3. A member of the class consisting of the isomeric nitroso-1-phenylpyraoles of the formula:

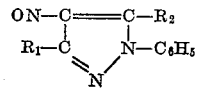

where $R_1$ and $R_2$ are different and are members of the class consisting of methyl and benzyl.

No references cited.